(12) United States Patent
Prabhu et al.

(10) Patent No.: US 11,544,389 B2
(45) Date of Patent: Jan. 3, 2023

(54) SYSTEMS AND METHODS FOR PERFORMING SECURE COMPUTING WHILE MAINTAINING DATA CONFIDENTIALITY

(71) Applicant: Acronis International GmbH, Schaffhausen (CH)

(72) Inventors: Sivanesan Kailash Prabhu, Singapore (SG); Mark Will, Singapore (SG); Sanjeev Solanki, Singapore (SG); Aarthi Kannan, Singapore (SG); Xiaolu Hou, Singapore (SG); Serguei Beloussov, Costa Del Sol (SG); Stanislav Protasov, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 227 days.

(21) Appl. No.: 16/819,269

(22) Filed: Mar. 16, 2020

(65) Prior Publication Data

US 2021/0286883 A1 Sep. 16, 2021

(51) Int. Cl.
*G06F 21/60* (2013.01)
*G06F 21/62* (2013.01)
*G06F 21/71* (2013.01)
*H04L 9/00* (2022.01)

(52) U.S. Cl.
CPC ........ *G06F 21/602* (2013.01); *G06F 21/6254* (2013.01); *G06F 21/71* (2013.01); *H04L 9/008* (2013.01)

(58) Field of Classification Search
CPC ........ H04L 9/00; H04L 9/008; G06F 21/602; G06F 21/6254; G06F 21/71

USPC ......................................................... 713/189
See application file for complete search history.

(56) References Cited

U.S. PATENT DOCUMENTS

| | | | | |
|---|---|---|---|---|
| 9,577,829 | B1 * | 2/2017 | Roth | G06F 21/60 |
| 10,423,806 | B2 * | 9/2019 | Cerezo Sanchez | G06F 40/18 |
| 10,498,772 | B2 * | 12/2019 | Adhar | H04L 63/105 |
| 2013/0097417 | A1 * | 4/2013 | Lauter | H04L 9/008 |
| | | | | 713/150 |
| 2017/0293913 | A1 * | 10/2017 | Gulak | H04L 63/0414 |
| 2018/0075262 | A1 * | 3/2018 | Auh | G06F 16/258 |

(Continued)

FOREIGN PATENT DOCUMENTS

| | | | | |
|---|---|---|---|---|
| WO | WO-2017161416 | A1 * | 9/2017 | H04L 63/1425 |
| WO | WO-2018174873 | A1 * | 9/2018 | G06N 3/08 |

*Primary Examiner* — Shin-Hon (Eric) Chen
*Assistant Examiner* — Ethan V Vo
(74) *Attorney, Agent, or Firm* — ArentFox Schiff LLP; Michael Fainberg (57) ABSTRACT

Disclosed herein are systems and method for performing secure computing while maintaining data confidentiality. In one exemplary aspect, a method receives, via an application, both data and a request to perform a secure operation on the data, wherein the secure operation is to be performed using a secure compute engine on a cloud platform such that the data is not viewable to a provider of the cloud platform. The method applies transformations to the data so that the data is not viewable to the provider. The method transmits the transformed data to the secure compute engine on the cloud platform to perform the secure operation on the transformed data, receives a result of the secure operation from the secure compute engine, and transmits the result to the application.

20 Claims, 4 Drawing Sheets

(56) References Cited

U.S. PATENT DOCUMENTS

2019/0007196 A1* 1/2019 Malluhi .............. H04L 63/0428
2020/0311231 A1* 10/2020 Levin .................. H04L 63/1425

* cited by examiner

SYSTEMS AND METHODS FOR PERFORMING SECURE COMPUTING WHILE MAINTAINING DATA CONFIDENTIALITY

FIELD OF TECHNOLOGY

The present disclosure relates to the field of data confidentiality, privacy, and security, and, more specifically, to systems and methods for performing secure computing while maintaining data confidentiality.

BACKGROUND

The proper storage, handling, and analysing of confidential data is highly important in the modern technological era in which data is shared in abundance and is processed remotely. For example, cloud-based servers offer affordable and on-demand resources for running analytics on datasets. With increasing privacy concerns and regulations, however, businesses cannot readily push confidential data into cloud servers because the cloud providers may see such data.

In another example, collaborative data analysis among multiple parties involves aggregating data from the multiple parties and analyzing the aggregated data. The data held by each such party may be confidential, which prevents the collaborative analysis because each party does not want to reveal its data to any other.

Conventional approaches that may enable cloud computing and collaborative analysis in view of the privacy concerns involve the encryption of data at rest and/or flight. Both are unsuitable for analysis, however, because encrypted data needs to be decrypted before analysis can be run. While certain cryptographic techniques such as secret sharing, homomorphic encryption, etc. are present in literature to tackle this issue, there is no unifying architecture or system to realize a complete end-to-end solution.

SUMMARY

Aspects of the disclosure relate to the field of data security. In particular, aspects of the disclosure describe methods and systems for performing secure computing while maintaining data confidentiality.

In one exemplary aspect, the method comprises receiving, via an application on a computing device, both data and a request to perform a secure operation on the data, wherein the secure operation is to be performed using a secure compute engine on a cloud platform such that the data is not viewable to a provider of the cloud platform. The method further comprises applying transformations to the data so that the data is not viewable to the provider. The applying is performed by constructing a chain of pre-processing operations that (1) convert incompatible attributes of the data with the secure compute engine into compatible attributes and (2) protects information in the data using a cryptographic technique on the data with compatible attributes. The applying then involves executing the chain of pre-processing operations using an engine connector that facilitates communication between the secure compute engine and an application programming interface (API) of the application, wherein the execution generates transformed data. The method comprises transmitting the transformed data to the secure compute engine on the cloud platform to perform the secure operation on the transformed data, receiving a result of the secure operation from the secure compute engine, and transmitting the result to the application.

In some aspects, transmitting the result to the application further comprises constructing a chain of post-processing operations that reverses the transformations to generate a finalized result, wherein the finalized result equals a potential result acquired if the secure operation was directly performed on the data without the transformations, and executing the chain of post-processing operations via the application.

In some aspects, the secure compute engine is further configured to receive additional transformed data from another application on at least one other computing device and combine the transformed data with the additional transformed data to create aggregated transformed data. The secure compute engine is further configured to perform the secure operation on the aggregated transformed data, and transmit a combined result to the application of the computing device and the another application on the at least one other computing device.

In some aspects, a user of the computing device specifies, over a user interface of the application, operations from a store of operations to include in the chain of pre-processing operations.

In some aspects, the method comprises validating the request based on a user identifier and a history of past requests.

In some aspects, the cryptographic technique is at least one of Shamir's secret sharing and homomorphic encryption.

In some aspects, the chain of pre-processing operations comprises at least one of removing, anonymizing, tokenizing, replacing, and truncating data fields of the data.

In some aspects, the secure operation comprises determining at least one of (1) descriptive statistics comprising average, standard deviation, and median, (2) predictive statistics comprising linear regression, logistic regression, and classification, and (3) custom functions comprising credit scoring.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for securing data using a secure compute engine. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

A system that is capable of performing privacy preserving compute operations is referred to as a secure compute engine. The engine may internally comprise individual components, servers, network connections, etc., that follow a pre-agreed secure protocol. Privacy preserving compute operations are conducted over data that has been transformed in a fashion that preserves data privacy. Many different techniques are available that provide this sort of compute facility including linear secret sharing, Shamir's secret sharing, homomorphic encryption, etc.

Figure 1:
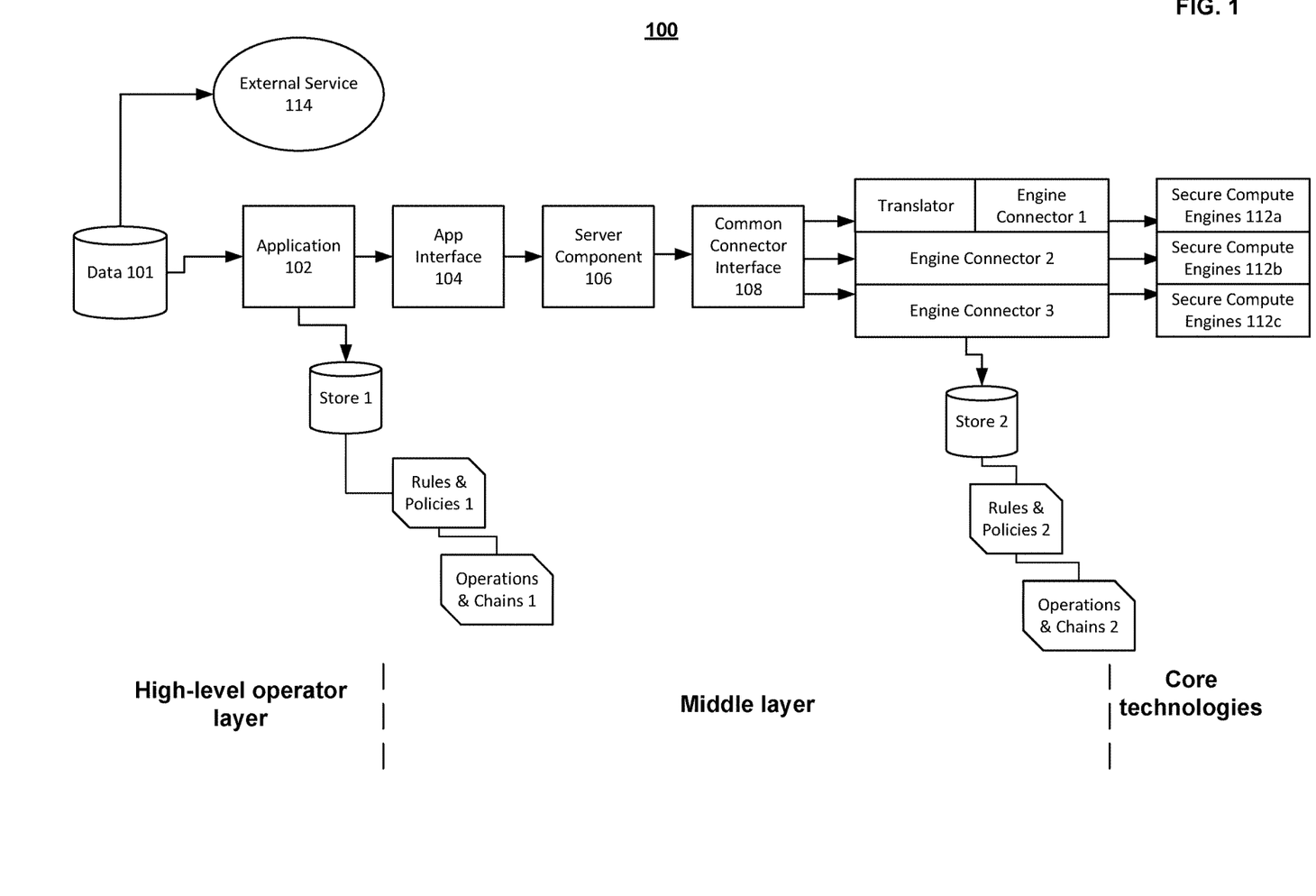
FIG. 1 is a block diagram illustrating a system for performing single-party secure computing while maintaining data confidentiality, in accordance with aspects of the present disclosure.

FIG. 1 is a block diagram illustrating a system 100 for performing single-party secure computing while maintaining data confidentiality, in accordance with aspects of the present disclosure. System 100 is designed to manage a diverse set of independent core technologies ("secure compute engines") using a single consistent framework. The system balances the need to provide a single consistent interface to many different engines with the ability to access the unique features of each engine, as well as enable an end-to-end solution that can both be deployed in an enterprise and be easily interfaced with existing applications of the enterprise.

The benefit of the system is that it enables rapid abstraction of sophisticated, but disparate core technologies so that high-level users or third-party apps can easily introspect and use the core technology without having to be bothered with the nuances of each such core technology. Moreover, new core technologies, either existing ones or ones to be developed in the future, can be plugged into the architecture with minimal disruption to existing workflows.

System 100 comprises application 102, which may include a user interface that can accept user inputs. Application 102 may be any software application on a computing device. Examples of application 102 include a table editor (e.g., Microsoft Excel). Application 102 may receive, via the user interface, data 101. Data 101 can be any object on a computing device such as a document, a photo, a video, an audio clip, etc. If application 102 is a table editor, for example, data 101 may be a comma-separated values (.csv) file. In some aspects, a user may upload data 101 to application 102, or may provide a link to the source of data 101 (e.g., an address comprising the chain of directories that lead to data 101).

Application 102 may also provide introspection capabilities such that a user can be made aware of the capabilities and functionalities of system 100 (e.g., list of supported secure compute engines, operations each engine supports, etc.). In addition to providing data 101, a user may select a secure operation to perform on data 101.

In an exemplary aspect, application 102 possesses store 1, which comprises rules & policies 1 and operations & chains 1. Rules & policies 1 may comprise functions such as access control, authentication, authorization, and other functions to enforce typical enterprise management requirements (e.g., read/write rights for data 101). The requirements may be fulfilled by application 102 itself or by an external service 114 (e.g., Lightweight Directory Access Protocol (LDAP), Active Directory (AD), Anonymizers, Tokenizers, etc.). For example, enterprises typically have their own access control servers, which application 102 can leverage instead of having to provide the functionalities itself. The external service 114 may provide these necessary access control functionalities. An example is single sign on where application 102 authenticates users against an existing AD server of an enterprise. Store 1 may also comprise artifacts such as certificates, API-keys etc., and may be administrated by a system admin via the user interface of application 102.

Operations & chains 1 refers to "pre-processing" and "post-processing" operations that can be chained together, where each operation transforms data 101 as it passes through the chain. Each such operation has a plugin format such that new operations can be developed, entered into the system, and used as part of a chain without affecting other operations. Examples of operations include: remove, anonymize, tokenize, replace, truncate data fields, etc. The user may select an operation via the user interface of application 102. In general, the operations may be shown to the user to facilitate the construction of a chain of operations or the selection of pre-built chains. The original data 101 and application 102 are part of the high-level operator layer that is associated with user interaction.

Considering the overarching example of csv file as an input, an example of an operation may be computing a mean value of a particular column in the csv file. There are two reasons as to why someone would want to do this is secure form. Assuming that the file is to be processed in the cloud (e.g., Amazon Web Services), the file owner may not want to reveal the contents of the file to the cloud provider. In a scenario where the csv file is an aggregate of data from multiple sources (e.g., two businesses contributing data individually), each business would submit their respective csv file to the secure engine. The engine would then run operations on the aggregated data. Again, neither the cloud provider nor the businesses get to see the portion of data that does not belong to them. In the context of the csv file, examples of pre-processing include removing fields that are empty, truncating strings to a particular length, removing certain columns, etc. Pre-processing can be considered as a form of data clean up. It is used to make data compatible with the secure engines as well as to satisfy other requirements like reducing data size, remove any unwanted fields, etc.

Application 102 comprises application interface 104, which is used to communicate with the secure compute engines 112 on one or more servers. Application interface 104 provides one or more APIs and SDKs to facilitate the communication. For example, a user may select a certain operation to perform on the user interface of application 102. The API receives the user's selection and data 101, and informs a respective secure compute engine 112a, 112b, and/or 112c. In order to invoke secure compute engines 112 using application interface 104 for data 101, server component 106 first processes data 101. In an example where application 102 is Microsoft Excel, application interface 104 may be a plugin of Microsoft Excel.

Server component 106 comprises common connector interface 108, a store of connectors (i.e., engine connector 1, 2, 3), and, in some aspects, comprises a translator. Server component 106 is a separate entity whose main function is to serve as a gateway between application 102 and the secure compute engines 112. Going back to the Excel example above, the server component 106 may receive data from the plugin (e.g., app interface 104), modify/translate the data if needed, and pass the modified/translated data to common connector interface 108. Similarly, when the results are back, server component 106 may get the results from common connector interface 108, translate/process the results if needed, and pass them to app interface 104.

The translator comprised in the store of connectors is a module configured to translate calls between common connector interface 108 and secure compute engines 112 if an engine connector is found not to be compatible with common connector interface 108. Multiple engine connectors (for different engine types) may be developed by Acronis or by a third-party. Control and modification capabilities may exist for certain third-party connectors, while for others, this may not be the case. To cater for all these cases, common connector interface 108 serves as a common interface (like a common standard). Accordingly, server component 106 does not have to be concerned with the details of the individual connectors. Server component 106 simply calls common connector interface 108, which is then responsible for calling the individual connectors.

Each engine connector may correspond to a particular secure compute engine (e.g., engine connector 1 may connect to secure compute engine 112a). Each engine connector may be an individual binary, library, or function-set that is developed by an engine owner, and conforms to common connector interface 108. Each such engine connector is responsible for talking to a respective secure compute engine to facilitate operations and passing results and statues back to the caller. Each such engine connector may possess a respective store 2 of "pre-processing" and "post-processing" operations in operations & chains 2 and rules in rules & policies 2. In FIG. 1, only the store of engine connector 3 is displayed for simplicity. However, as noted, each engine connector may have their own store (not depicted). The operations and chains further transform data 101 to conform to the requirements and nuances of the respective secure compute engines.

Common connector interface 108 is invoked by server component 106 to transmit the data 101 as transformed by the engine connectors to secure compute engines 112. The transformed data 101 has been pre-processed, formatted and transformed such that it is compatible with the one or more respective secure compute engines 112a, 112b, and 112c. The engine connectors 1, 2, and 3 are responsible for converting the data (e.g., the fields in a csv file) to the secure format that each secure engine 112a, b, and c expects. As an example, for a linear secret sharing (LSS) engine, an engine connector may take a field of the csv file and generate N number of random numbers (N>=2). For a homomorphic engine (HE), an engine connector may take a field of the csv file and generate N number (N>=1) of cipher texts based on one or more ciphers. This sort of transformation is done for each data field.

The transformed data 101 may also be accompanied with metadata that specifies the intended operations to be performed by the respective secure compute engines 112. This metadata may be generated by application 102 (where the user may indicate the security operations that secure compute engines 112 are to perform).

One or more secure compute engines 112 receives the transformed data 101 and proceeds to execute its respective secure operation to fulfill the requested operations in the metadata. Examples of secure operations include descriptive statistics such as average, standard deviation, median etc., predictive statistics such as linear regression, logistic regression etc., and custom functions such as credit scoring. As mentioned before, if the data for the computation is to be hosted on the cloud, then data owner would not want cloud provider (e.g., Amazon Web Services) to see the data. If the data comes from multiple businesses (e.g., a bank providing salary data and the Internal Revenue Service providing tax data) and the secure computation needs to be performed on this combined data as the data owners would not want to reveal their respective data to the other party.

Subsequently, the one or more secure compute engines returns the result(s) and status(es) of the execution. For example, if the secure computation was the mean of salaries, the result would be a number (e.g., 5000.45). A status can be informational message comprising the time it took to complete the computation, whether the computation was successfully performed, whether the operation failed, etc. The returned results and statues travel back via the application interface 104 and is presented to user on the user interface of application 102. The return may happen (1) periodically pulled by the user or pushed to the user, (2) at the end of a compute operation, or (3) after post-processing of the results and statuses. The post-processing may occur at application 102 or at server component 106 (similar to how pre-preprocessing is done via a chain of operations). Post-processing may involve the construction of results to be presented in a compatible fashion on the application 102 to the user. This is because the raw results from common connector interface 108 may not make sense to a user as such. As an example, gender data encoded may be listed as integers (I/O). Post-processing may involve translating the 1's and 0's to "male" and "female."

Figure 2:
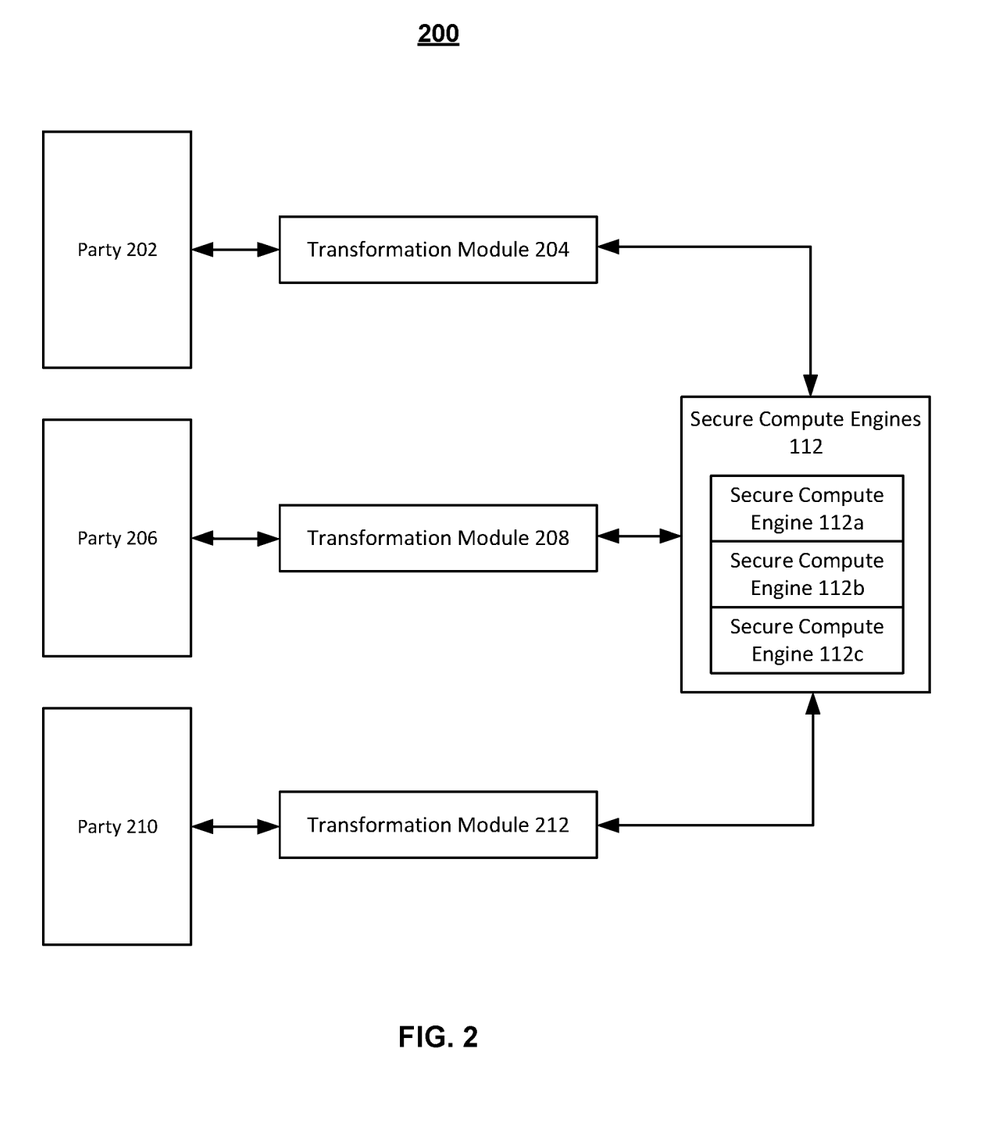
FIG. 2 is a block diagram illustrating performing multi-party secure computing while maintaining data confidentiality, in accordance with aspects of the present disclosure.

FIG. 2 is a block diagram illustrating a system 200 for performing multi-party secure computing while maintaining data confidentiality, in accordance with aspects of the present disclosure. System 200 comprises parties 202, 206, and 210. These parties may represents users, institutions, companies, etc. For example, the parties may be two banks and a tax entity that are all part of a consortium. Each party may possess their own data that they do not want to reveal to one another. The parties may together want to perform a secure operation (e.g., predicting tax from salaries). The secure operation may be performed by secure compute engines 112 hosted on a cloud platform. Transformation modules 204, 208, and 212 each comprise the components: application 102 (with store 1), app interface 104, server component 106, common connector interface 108, translator, engine connectors 1-3, and store 2.

Suppose that party 202 and party 206 are banks that each provide csv file(s) comprising information such as the names of employees, their job position, their salary, their tax exemptions, etc. Party 210 may be a tax entity that provides csv file(s) of tax rates based on exemptions and salary. Secure compute engine 112 may be configured to take data from each party (after it has been processed through their respective transformations) and using a secure operation (e.g., a machine learning algorithm) that predicts tax using the salaries, tax rates, and exemptions. More specifically, secure compute engine 112 (or one or more of 112a, 112b, and 112c) may combine the transformed data received from each transformation module, perform the secure operation on the aggregated transformed data, and transmit a combined result to the respective application of each party.

The results (e.g., the tax values) are transmitted back to parties 202, 206, and 210. Using this system, none of the parties share information with each other. For example, party 202 does not reveal salaries to party 206. In addition, because of the transformations applied to each of the data files, the cloud provider that provides the cloud platform also does not see the respective data.

In some aspects, secure compute engines 112 may be hosted by one single party in the consortium or each party may host one instance of 112 (e.g., party 202 hosts 112a, party 206 hosts 112b, etc.). Even in this scenario, because transformations are applied to the data before a secure compute engine receives the data, the data is kept confidential from the host.

It should be noted that although transformation modules 204, 208, and 212 have similar structures, the operations and conversions performed in each transformation may be different. This is because the computing devices and applications used by each party may be different. In some aspects, secure compute engine 112 may indicate which pre-processing operations to perform such that the secure operation can be performed.

In some aspects, when the result of a secure operation is received from the secure compute engine, the result may need to be reconfigured so that each of the parties can interpret them. Transformation modules 204, 208, and 212 may each construct a chain of post-processing operations that reverses the transformations applied during the pre-processing operations to generate a finalized result. The finalized result equals a potential result that would be acquired if the secure operation was directly performed on the data without the transformations. Transformation modules 204, 208, and 212 may then each execute the respective chain of post-processing operations via their respective applications.

Figure 3:
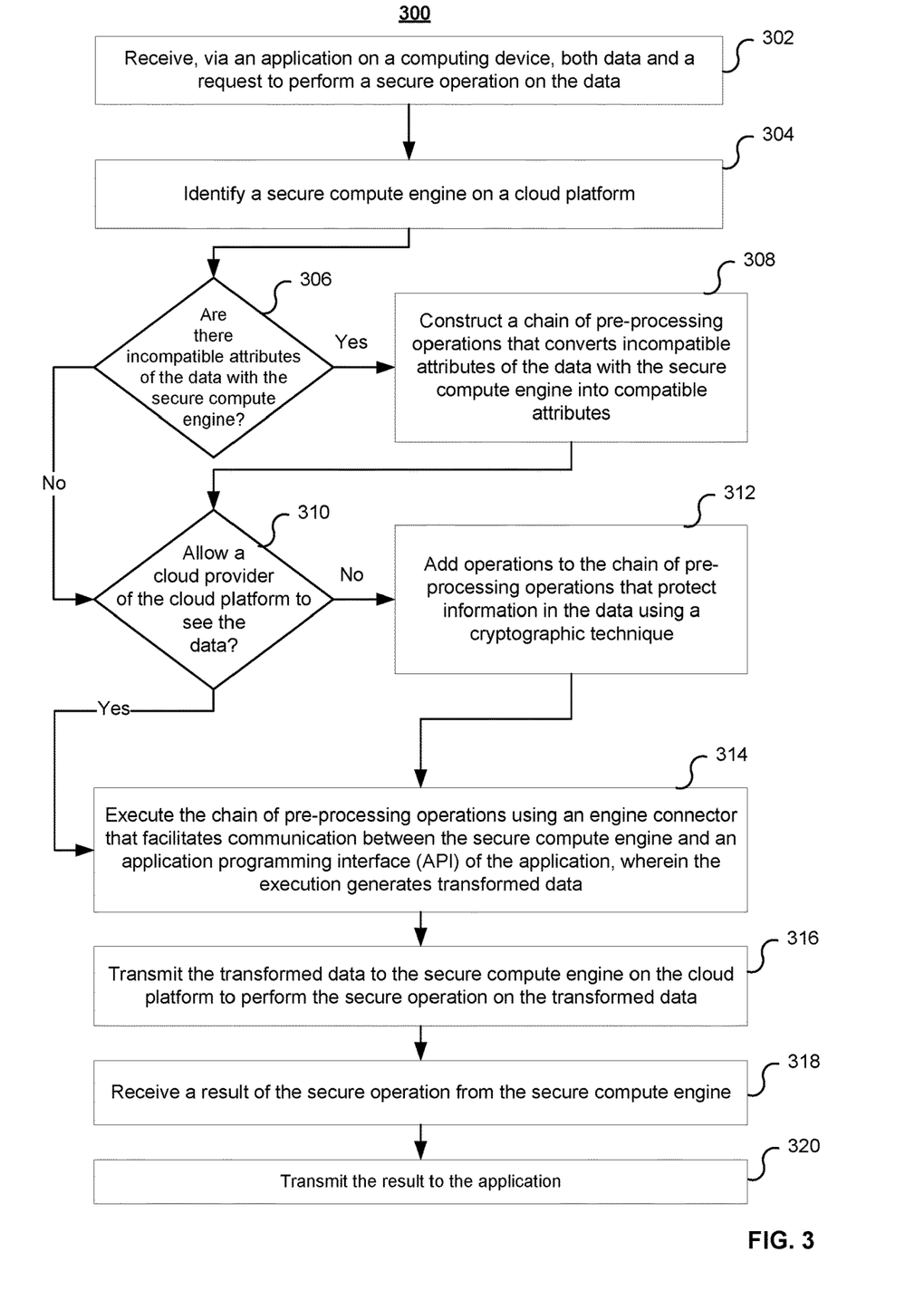
FIG. 3 illustrates a flow diagram of a method for performing secure computing while maintaining data confidentiality, in accordance with aspects of the present disclosure.

FIG. 3 illustrates a flow diagram of method 300 for performing secure computing while maintaining data confidentiality, in accordance with aspects of the present disclosure. At 302, server component 106 receives, via an application on a computing device, both data and a request to perform a secure operation on the data. At 304, server component 106 identifies a secure compute engine on a cloud platform. In some aspects, the request itself specifies which secure compute engine should perform the secure operation. For example, the request may specifically request that secure compute engine 112c be the engine that performs the secure operation. In some aspects, server component 106 stores a list of secure operations that each secure compute engine 112 can perform. Based on the requested secure operation (e.g., classification), server component 106 may select the secure compute engine that is known to perform the secure operation as indicated in the list.

At 306, server component 106 determines whether there are incompatible attributes of the data with the secure compute engine. For example, the extension (file type) of the data, the formatting of the information within the data, the size of the data, etc., may be incompatible attributes. Referring to the list of secure operations, server component 106 may further track the inputs and outputs of each secure operation. For example, a secure operation that performs classification to determine which tax bracket customers of a bank fall under (without revealing the identities and source of the salary information for the customers) may take an input of a csv file that includes monthly salary information. If a user provides an excel file (i.e., .xlsx) instead of a csv file, server component 106 may detect an incompatible attribute.

In response to determining that there are incompatible attributes of the data, at 308, server component 106 constructs a chain of pre-processing operations that converts incompatible attributes of the data with the secure compute engine into compatible attributes. For example, a first operation may convert the xlsx file to a csv file. A second operation in the chain may adjust the columns in the csv file by removing empty columns. A third operation in the chain may adjust the number of decimal points in the csv file such that only integers are present in the file (rounding up/down). In some aspects, a user provides, over a user interface of the application, operations from a store of operations to include in the chain of pre-processing operations via the request. In some aspects, server component 106 may store a profile of the user in order to validate the request based on a user identifier and a history of past requests. For example, certain operations specified by the user may not adequately secure the data such that the cloud provider or any other entity cannot see the data. Server component 106 may recognize that the profile of the user indicates a history of past requests with a certain set of operations. If the historic operations do not match with the newly requested operation or a user identifier is incorrect as indicated by a profile mismatch, it is possible that the entity requesting the secure operation is in fact not the user. Accordingly, server component 106 may perform these validation procedures to prevent data breaches.

After constructing the chain of pre-processing operations, or in response to determining that there are no incompatible attributes, method 300 proceeds to 310, where server component 106 determines whether to allow a cloud provider of the cloud platform to see the data. For example, the data may include sensitive information (e.g., the names of bank customers alongside their respective salaries) that a user (e.g., a bank) may not want the cloud provider (e.g., Amazon Web Services) to view/access.

In response to determining that the cloud provider should not be able to see the data, method 300 advances to 312, where server component 106 adds operations to the chain of pre-processing operations that protect information in the data using a cryptographic technique. For example, an added operation may apply homomorphic encryption to the data. Another added operation may remove a column comprising the names of the customers to ensure anonymity.

After adding the operations or in response to determining that cloud provider is allowed to see the data, method 300 advances to 314 where server component 106 executes the chain of pre-processing operations using an engine connector that facilitates communication between the secure compute engine and an application programming interface (API) of the application, wherein the execution generates transformed data. In some aspects, the operations that convert the incompatible attributes are executed by a translator of server component 106.

At 316, server component 106 transmits the transformed data to the secure compute engine on the cloud platform to perform the secure operation on the transformed data. At 318, server component 106 receives a result of the secure operation from the secure compute engine. At 320, server component 106 transmits the result to the application.

Figure 4:
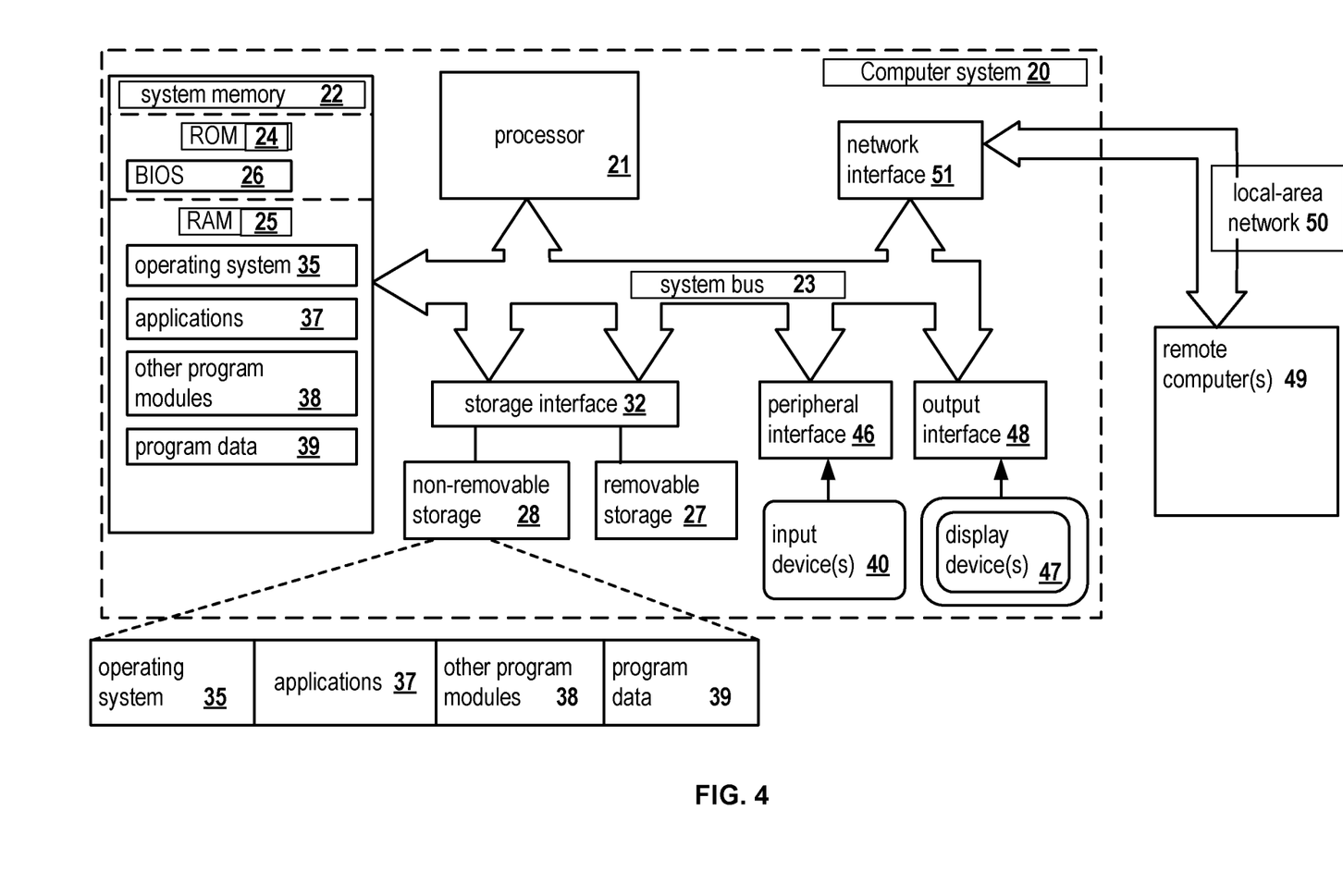
FIG. 4 presents an example of a general-purpose computer system on which aspects of the present disclosure can be implemented.

FIG. 4 is a block diagram illustrating a computer system 20 on which aspects of systems and methods for performing secure computing while maintaining data confidentiality may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-3 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for performing secure computing while maintaining data confidentiality, the method comprising:
   receiving, via an application on a computing device, both data and a request to perform a secure operation on the data, wherein the secure operation is to be performed using a secure compute engine on a cloud platform such that the data is not viewable to a provider of the cloud platform;
   in response to determining that the secure operation to be performed using the secure compute engine matches an operation in a history of past requests associated with an authorized user, applying transformations to the data so that the data is not viewable to the provider by:
      constructing a chain of pre-processing operations that (1) converts incompatible attributes of the data with the secure compute engine into compatible attributes and (2) protects information in the data using a cryptographic technique on the data with compatible attributes; and
      executing the chain of pre-processing operations using an engine connector that facilitates communication between the secure compute engine and an application programming interface (API) of the application, wherein the execution generates transformed data;
   transmitting the transformed data to the secure compute engine on the cloud platform to perform the secure operation on the transformed data;
   receiving a result of the secure operation from the secure compute engine; and
   transmitting the result to the application.

2. The method of claim 1, wherein transmitting the result to the application further comprises:
   constructing a chain of post-processing operations that reverses the transformations to generate a finalized result, wherein the finalized result equals a potential result acquired if the secure operation was directly performed on the data without the transformations; and
   executing the chain of post-processing operations via the application.

3. The method of claim 1, wherein the secure compute engine is further configured to:
   receive additional transformed data from another application on at least one other computing device;
   combine the transformed data with the additional transformed data to create aggregated transformed data;
   perform the secure operation on the aggregated transformed data; and
   transmit a combined result to the application of the computing device and the another application on the at least one other computing device.

4. The method of claim 1, wherein a user of the computing device specifies, over a user interface of the application, operations from a store of operations to include in the chain of pre-processing operations.

5. The method of claim 1, further comprising validating the request based on a user identifier of the authorized user.

6. The method of claim 1, wherein the cryptographic technique is at least one of Shamir's secret sharing and homomorphic encryption.

7. The method of claim 1, wherein the chain of pre-processing operations comprises at least one of removing, anonymizing, tokenizing, replacing, and truncating data fields of the data.

8. The method of claim 1, wherein the secure operation comprises determining at least one of (1) descriptive statistics comprising average, standard deviation, and median, (2) predictive statistics comprising linear regression, logistic regression, and classification, and (3) custom functions comprising credit scoring.

9. A system for performing secure computing while maintaining data confidentiality, the system comprising:
a hardware processor configured to:
receive, via an application on a computing device, both data and a request to perform a secure operation on the data, wherein the secure operation is to be performed using a secure compute engine on a cloud platform such that the data is not viewable to a provider of the cloud platform;
in response to determining that the secure operation to be performed using the secure compute engine matches an operation in a history of past requests associated with an authorized user, apply transformations to the data so that the data is not viewable to the provider by:
constructing a chain of pre-processing operations that (1) converts incompatible attributes of the data with the secure compute engine into compatible attributes and (2) protects information in the data using a cryptographic technique on the data with compatible attributes; and
executing the chain of pre-processing operations using an engine connector that facilitates communication between the secure compute engine and an application programming interface (API) of the application, wherein the execution generates transformed data;
transmit the transformed data to the secure compute engine on the cloud platform to perform the secure operation on the transformed data;
receive a result of the secure operation from the secure compute engine; and
transmit the result to the application.

10. The system of claim 9, wherein the hardware processor is configured to transmit the result to the application by:
constructing a chain of post-processing operations that reverses the transformations to generate a finalized result, wherein the finalized result equals a potential result acquired if the secure operation was directly performed on the data without the transformations; and
executing the chain of post-processing operations via the application.

11. The system of claim 9, wherein the secure compute engine is further configured to:
receive additional transformed data from another application on at least one other computing device;
combine the transformed data with the additional transformed data to create aggregated transformed data;
perform the secure operation on the aggregated transformed data; and
transmit a combined result to the application of the computing device and the another application on the at least one other computing device.

12. The system of claim 9, wherein a user of the computing device specifies, over a user interface of the application, operations from a store of operations to include in the chain of pre-processing operations.

13. The system of claim 9, wherein the hardware processor is further configured to validate the request based on a user identifier of the authorized user.

14. The system of claim 9, wherein the cryptographic technique is at least one of Shamir's secret sharing and homomorphic encryption.

15. The system of claim 9, wherein the chain of pre-processing operations comprises at least one of removing, anonymizing, tokenizing, replacing, and truncating data fields of the data.

16. The system of claim 9, wherein the secure operation comprises determining at least one of (1) descriptive statistics comprising average, standard deviation, and median, (2) predictive statistics comprising linear regression, logistic regression, and classification, and (3) custom functions comprising credit scoring.

17. A non-transitory computer readable medium storing thereon computer executable instructions for performing secure computing while maintaining data confidentiality, including instructions for:
receiving, via an application on a computing device, both data and a request to perform a secure operation on the data, wherein the secure operation is to be performed using a secure compute engine on a cloud platform such that the data is not viewable to a provider of the cloud platform;
in response to determining that the secure operation to be performed using the secure compute engine matches an operation in a history of past requests associated with an authorized user, applying transformations to the data so that the data is not viewable to the provider by:
constructing a chain of pre-processing operations that (1) converts incompatible attributes of the data with the secure compute engine into compatible attributes and (2) protects information in the data using a cryptographic technique on the data with compatible attributes; and
executing the chain of pre-processing operations using an engine connector that facilitates communication between the secure compute engine and an application programming interface (API) of the application, wherein the execution generates transformed data;
transmitting the transformed data to the secure compute engine on the cloud platform to perform the secure operation on the transformed data;
receiving a result of the secure operation from the secure compute engine; and
transmitting the result to the application.

18. The non-transitory computer readable medium of claim 17, wherein the instruction for transmitting the result to the application further comprises instructions for:
constructing a chain of post-processing operations that reverses the transformations to generate a finalized result, wherein the finalized result equals a potential result acquired if the secure operation was directly performed on the data without the transformations; and
executing the chain of post-processing operations via the application.

19. The non-transitory computer readable medium of claim 17, wherein the secure compute engine is further configured to:
receive additional transformed data from another application on at least one other computing device;

combine the transformed data with the additional transformed data to create aggregated transformed data;
perform the secure operation on the aggregated transformed data; and
transmit a combined result to the application of the computing device and the another application on the at least one other computing device.

20. The non-transitory computer readable medium of claim 17, wherein a user of the computing device specifies, over a user interface of the application, operations from a store of operations to include in the chain of pre-processing operations.

\* \* \* \* \*